United States Patent
Ritt

(10) Patent No.: US 6,810,555 B2
(45) Date of Patent: Nov. 2, 2004

(54) WIPER ARM, ESPECIALLY FOR A WINDSCREEN-WIPING DEVICE OF A MOTOR VEHICLE

(75) Inventor: Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,874

(22) PCT Filed: Feb. 28, 2002

(86) PCT No.: PCT/DE02/00751

§ 371 (c)(1),
(2), (4) Date: Nov. 27, 2002

(87) PCT Pub. No.: WO02/096729

PCT Pub. Date: Dec. 5, 2002

(65) Prior Publication Data

US 2003/0110587 A1 Jun. 19, 2003

(30) Foreign Application Priority Data

May 29, 2001 (DE) .......................................... 101 26 258

(51) Int. Cl.⁷ ................................................. B60S 1/34
(52) U.S. Cl. ............................. 15/250.352; 15/250.351
(58) Field of Search ..................... 15/250.351, 250.352, 15/250.34, 250.31

(56) References Cited

U.S. PATENT DOCUMENTS

| 4,170,804 | A | | 10/1979 | Scotcher ................... 15/250.34 |
| 4,502,178 | A | * | 3/1985 | Ragot et al. .............. 15/250.34 |
| 4,704,761 | A | * | 11/1987 | South et al. .............. 15/250.19 |
| 4,856,137 | A | | 8/1989 | Palu ....................... 15/250.352 |
| 5,253,388 | A | * | 10/1993 | Bacconnier ............ 15/250.203 |
| 5,652,994 | A | * | 8/1997 | Egner-Walter et al. 15/250.351 |
| 5,680,669 | A | * | 10/1997 | Egner-Walter ......... 15/250.352 |
| 5,903,953 | A | * | 5/1999 | Dimur et al. ............ 15/250.04 |

FOREIGN PATENT DOCUMENTS

| DE | 3428795 | * | 2/1985 | .............. 15/250.34 |
| DE | 198 05 316 A | | 8/1998 | |
| DE | 197 47 857 A | | 5/1999 | |
| EP | 0208960 | * | 1/1987 | ............ 15/250.351 |
| EP | 0584018 | * | 2/1994 | .............. 15/250.34 |
| EP | 0 845 394 A | | 6/1998 | |
| FR | 2646801 | * | 11/1990 | ............ 15/250.351 |
| GB | 2117630 | * | 10/1983 | .............. 15/250.34 |

* cited by examiner

Primary Examiner—Gary K. Graham
(74) Attorney, Agent, or Firm—Michael J. Striker

(57) ABSTRACT

A wiper arm (10), in particular for a motor vehicle wiper system is proposed, having a pivot part (12) made of plastic, which has two ends and on a first end (16) can be connected to a wiper blade and also, on its second end (18) remote from the first end, is connected rotatably to a fastening part (14); the fastening part (14) is made of sheet metal.

6 Claims, 6 Drawing Sheets

WIPER ARM, ESPECIALLY FOR A WINDSCREEN-WIPING DEVICE OF A MOTOR VEHICLE

BACKGROUND OF THE INVENTION

The invention relates to a wiper arm, in particular for a rear-window wiper system of a motor vehicle.

Numerous wiper arms for motor vehicle wiper systems are already known. These wiper arms have a plastic pivot part that has a wiper blade on one end. The other end is connected rotatably to a fastening part, which transmits the pendulum motion of the wiper shaft to the pivot part and thus to the wiper blade. The fastening part is embodied as a cast zinc, aluminum or plastic part.

SUMMARY OF THE INVENTION

The wiper arm of the invention having the characteristics of the main claim has the advantage that by the combination of a pivot part made of plastic with a fastening part made of sheet metal, greater torque strength is attained, and the joint between the bit and the pivot part can be achieved more easily.

In contrast to cast parts, sheet metal has hardly any creepage, and is also less expensive than cast zinc or aluminum parts.

It is especially advantageous if the pivot part, at least in the region of the second end, is shaped essentially in the form of an inverted U, and the fastening part at least partly embraces the pivot part in that region. Because the fastening part at least partly embraces the pivot part, rotary elements can be disposed on the outside of the U-shaped pivot part, instead of inside it. As a result, the pivot part is easier to make, because the number of slides in the injection-molding process, for instance, can be reduced.

It is especially advantageous if the pivot part is tapered in the region of the second end and at least one hinge pin is disposed in the tapered region. In this way, the consumption of material for the fastening part, which is intended to embrace the pivot part in this region, can be kept low. Moreover, a smooth surface between the pivot part and the fastening part can thus be achieved.

It is especially advantageous if the fastening part has a U-shaped opening pointing toward the pivot part and embracing the hinge pin on the fastening part. This makes it simple and inexpensive to achieve the rotatability between the fastening part and the pivot part.

It is moreover especially advantageous if the tapered region has a fastening element for securing a guard cap. If the guard cap is secured to the hinge pin, then the guard cap, too, can be embodied rotatably. As a result, the guard cap can protect the fastening part against environmental effects, and thus corrosion of the fastening part can be avoided.

It is also advantageous if the hinge pin is braced in the direction of the first end by bracing elements. This increases the durability of the hinge pin and thus of the fastening part, because the hinge pin is prevented from breaking off.

It is especially advantageous if the bracing elements act as stops for limiting the rotational angle, because this dual function means that no additional stops for rotational angle limitation are needed.

It is considered a further advantage if the hinge pin does not extend through the pivot part, but instead is formed only onto the outside of the lateral flanks of the U-shaped pivot part. As a result there is enough room inside the pivot part to accommodate a spring element, making it possible to do without an angle bracket or the like.

It is also advantageous if the pivot part and the fastening part are clamped together via at least one essentially straight spring element. As a result, the rotatable connection between the pivot part and the fastening part can be very simple in design.

BRIEF DESCRIPTION OF THE DRAWINGS

One exemplary embodiment of the invention is shown in the drawings and explained in further detail in the ensuing description. Shown are.

DETAIL DESCRIPTION OF THE PREFERRED EMBODIMENTS

Figure 1:
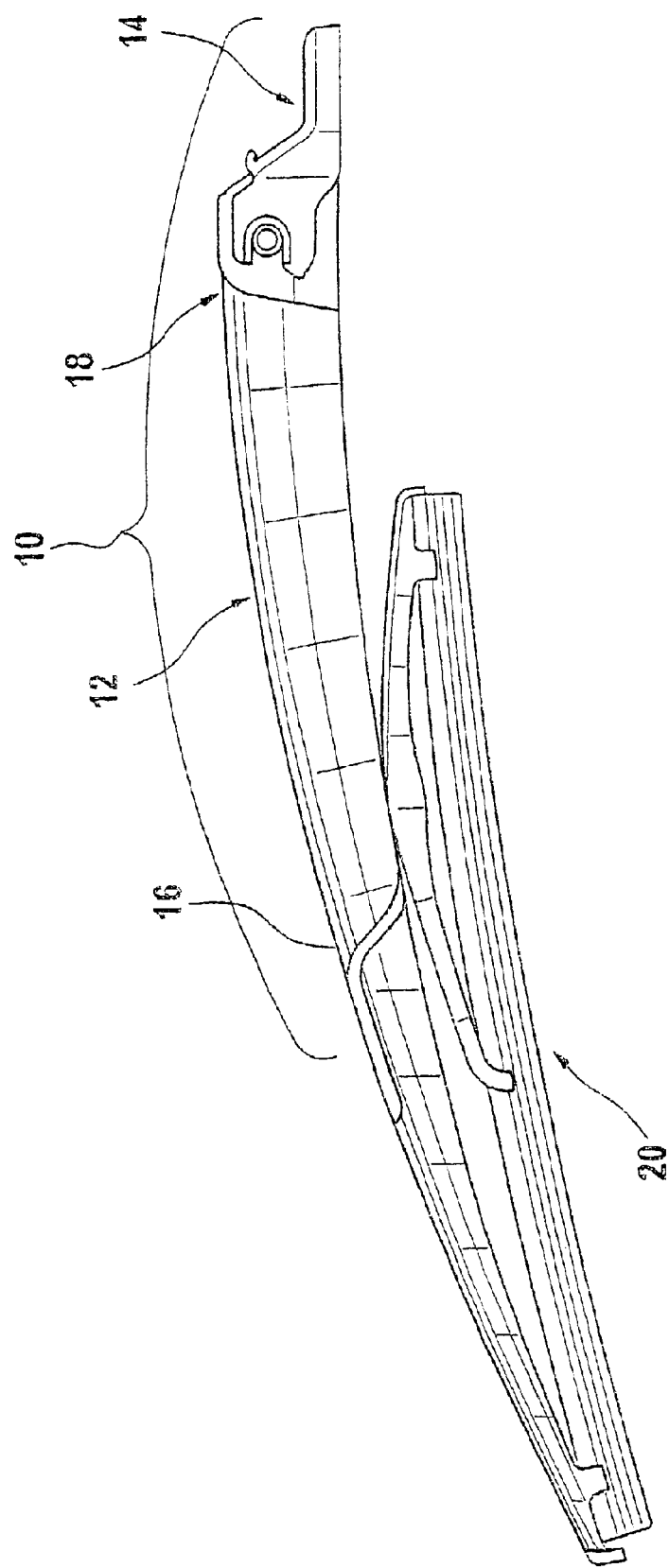
FIG. 1, a side view of a wiper arm of the invention.

In FIG. 1, a wiper arm 10 of the invention is shown in a side view. It substantially comprises a pivot part 12 and a fastening part 14. The pivot part 12 has two ends 16, 18; the first end 16 is connected to a wiper blade 20. The second end 18 of the pivot part 12 is connected rotatably to the fastening part 14.

Figure 2:
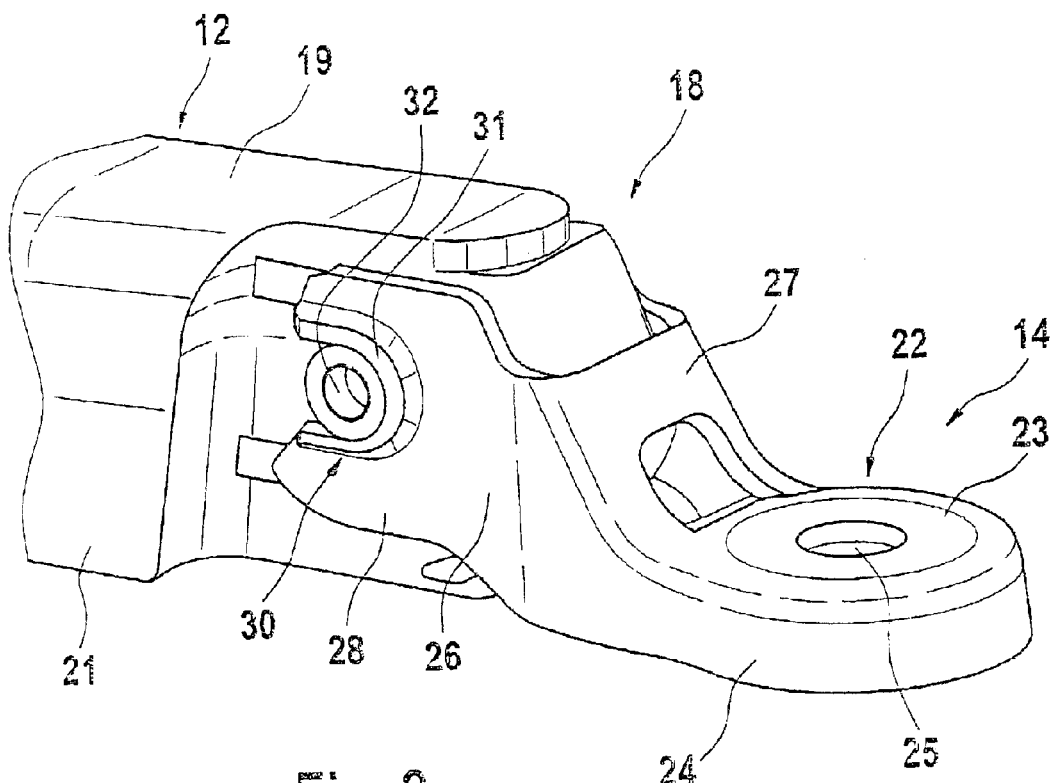
FIG. 2, a perspective side view of both the second end of a pivot part and a fastening part.

In FIG. 2, the second end 18 of the pivot part 12 is shown, along with the fastening part 14, in detail. The pivot part 12, at least in the region of its second end 18, is substantially in the form of an inverted U, comprising a base 19 and two side cheeks 21. The pivot part 12 is also tapered somewhat in this region; that is, the base 19 of the U of the pivot part 12 is somewhat smaller in the region of the second end 18, and the side cheeks 21 are offset inward somewhat there (see FIG. 3).

The fastening part 14 is embodied as a stamped and bent sheet-metal part. It has an eyelet 22, which is formed of a top face 23 with a conical opening 25 and is bounded laterally, except for a portion approximately 100° wide, by a downward-pointing collar 24. The conical opening 25 is located in the middle of the top face 23. Perpendicular to the plane of the conical opening 25, the collar 24 extends past the eyelet 22 and forms a clamplike recess 26 into which the tapered second end 18 of the pivot part 12 fits conformally. The recess 26 essentially comprises two flanks 28, formed of the extension of the collar 24, on the ends of which are respective U-shaped openings 30 pointing in the direction of the pivot part 12, and these openings are engaged by the hinge pins 32 of the pivot part 12. For reinforcement, the edge of the opening 30 is surrounded by a reinforcing ring 31.

For reinforcement of the flanks 28, the top face 23 of the eyelet 22 extends onward, in the form of a reinforcing element 27, in the direction of the openings 30, between the flanks 28.

Figure 3:
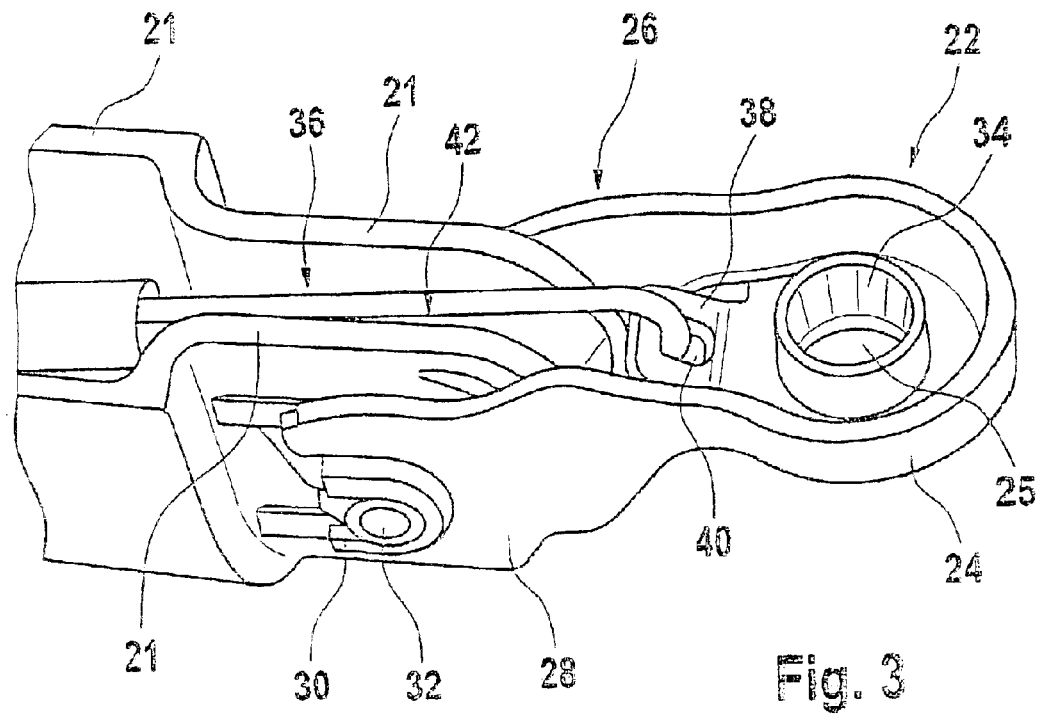
FIG. 3, a perspective view from below of the pivot part and the fastening part of FIG. 2.

In FIG. 3, the pivot part 12 with its second end 18 is shown in a view from below, along with the fastening part 14. The hole in the eyelet 22 is surrounded in collarlike fashion by a cone 34 and thus forms the conical element 25, which in the mounted state is provided so as to secure the fastening part 14 to the wiper shaft of a wiper system. On the outside, the eyelet 22 is for the most part surrounded by the collar 24. The collar 24 is extended laterally to the flanks 28, thus forming the recess 26. In this recess 26, the tapered region of the second end 18 of the pivot part 12 is fitted in. The hinge pins 32 engage the U-shaped openings 30. The open side of the U of these openings 30 points toward the pivot part 12. Naturally, it is possible to narrow the open side of the opening 30 somewhat, so that the hinge pins 32 can snap into the opening 30.

The hinge pins 32 are merely placed on the side cheeks 21 and to not extend through the tapered region of the second end 18.

Also, a tap 38 is stamped out of the reinforcing element 27 of the fastening part and bent, and it has a hole 40 for receiving a spring element 42.

Figure 4:
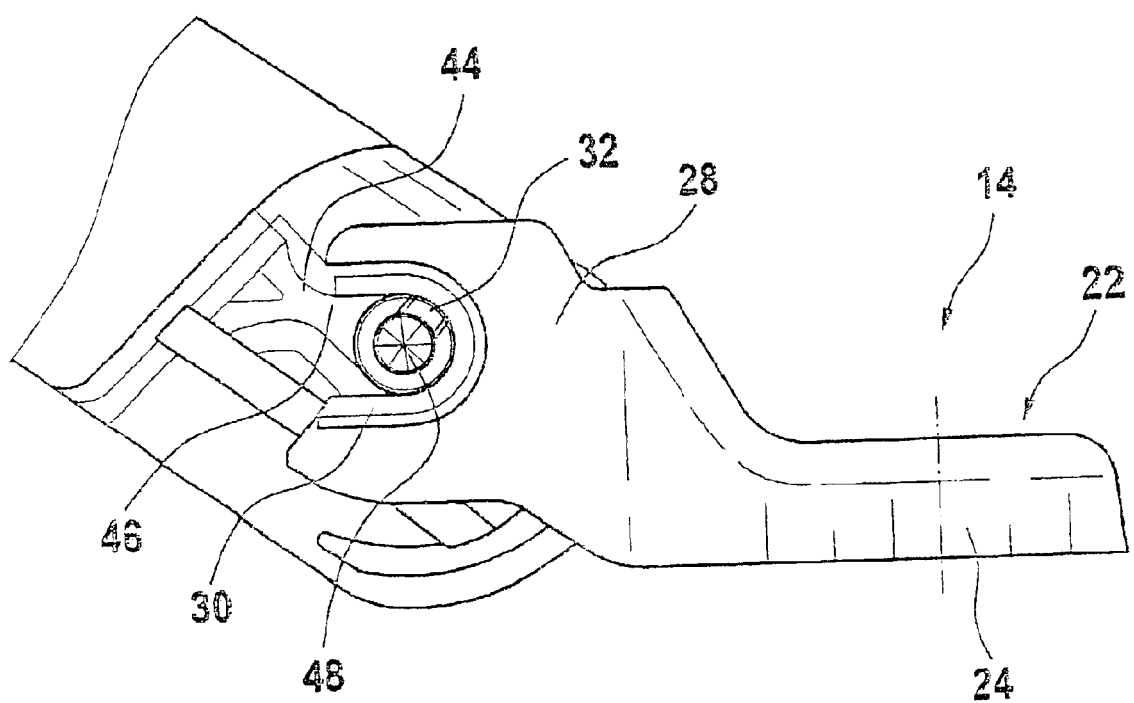
FIG. 4, a side view of the second end of a pivot part of the invention, in the folded-shut position.

In FIG. 4, the second end 18 of the pivot part 12 is shown in a side view, along with the fastening part 14. The hinge pin 32, on the side remote from the fastening part 14, is braced by a bracing element 44. This bracing element 44 simultaneously acts as a rotational angle limitation, to limit the maximum possible rotational angle between the fastening part 14 and the pivot part 12. To that end, the bracing element 44 is embodied such that it strikes the opening 30, on its corner toward the pivot part, when the maximum allowed rotational angle between the pivot part 12 and the pivot part 14 is reached. Naturally, this is correspondingly possible for both limit positions.

Figure 5:
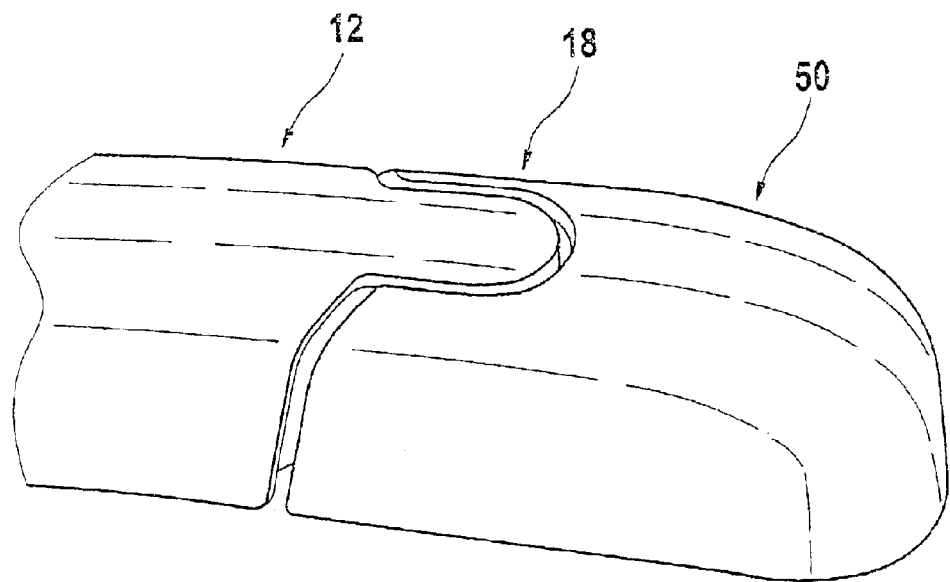
FIG. 5, a second end of a pivot part of the invention with a guard cap.

The hinge pin is moreover embodied such that it has a fastening element 48 for securing a guard cap 50 (FIG. 5). This fastening element 48 is embodied here as a small bore that can be engaged on the inside by a bump, formed out of the inside of the guard cap 50. In this way, it is also possible to design the guard cap so that it can be folded shut.

In FIG. 5, the second end 18 of the pivot part 12 is shown, with the fastening part 14 covered by the guard cap 50.

Figure 6:
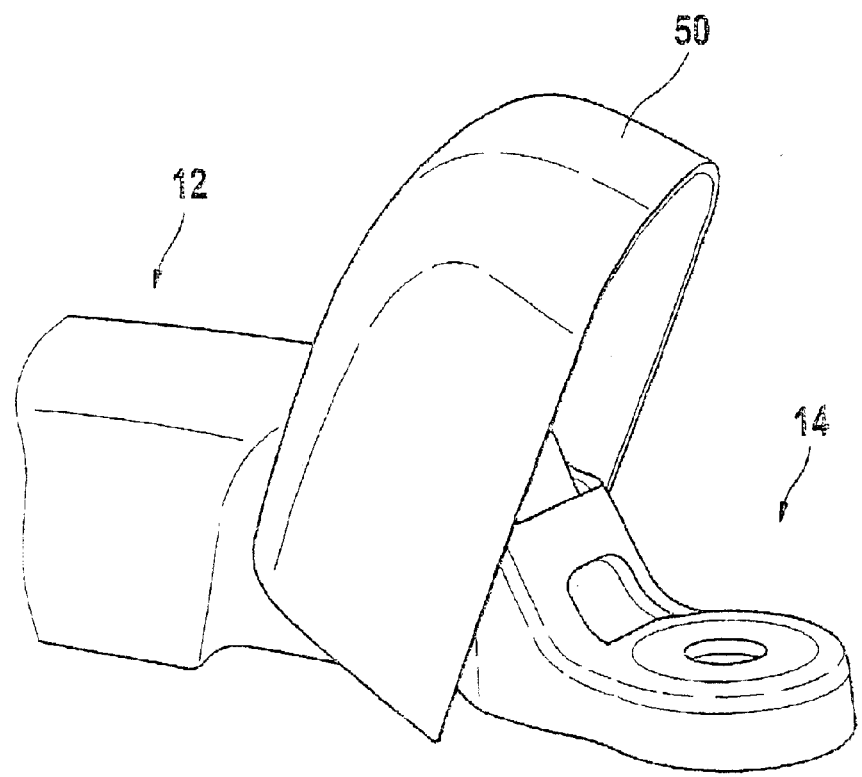
FIG. 6, the second end of a pivot part of the invention with a guard cap, in the folded-open position.

In FIG. 6, the guard cap 50 of FIG. 5 is shown in the folded-open position.

Figure 7:
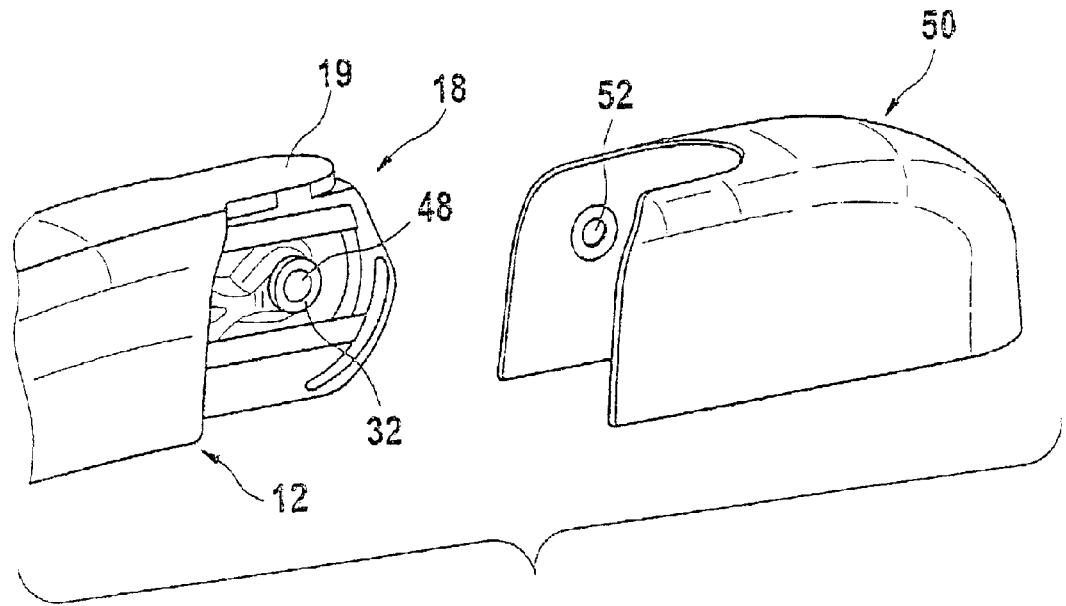
FIG. 7, a second end of a pivot part of the invention with a guard cap, prior to assembly.

In FIG. 7, the second end 18 of the pivot part 12 and the guard cap 50 are shown in detail. The base 19 of the second end 18 is embodied such that it extends beyond the hinge pin 32 and is located in the same plane as the guard cap 50.

Figure 8:
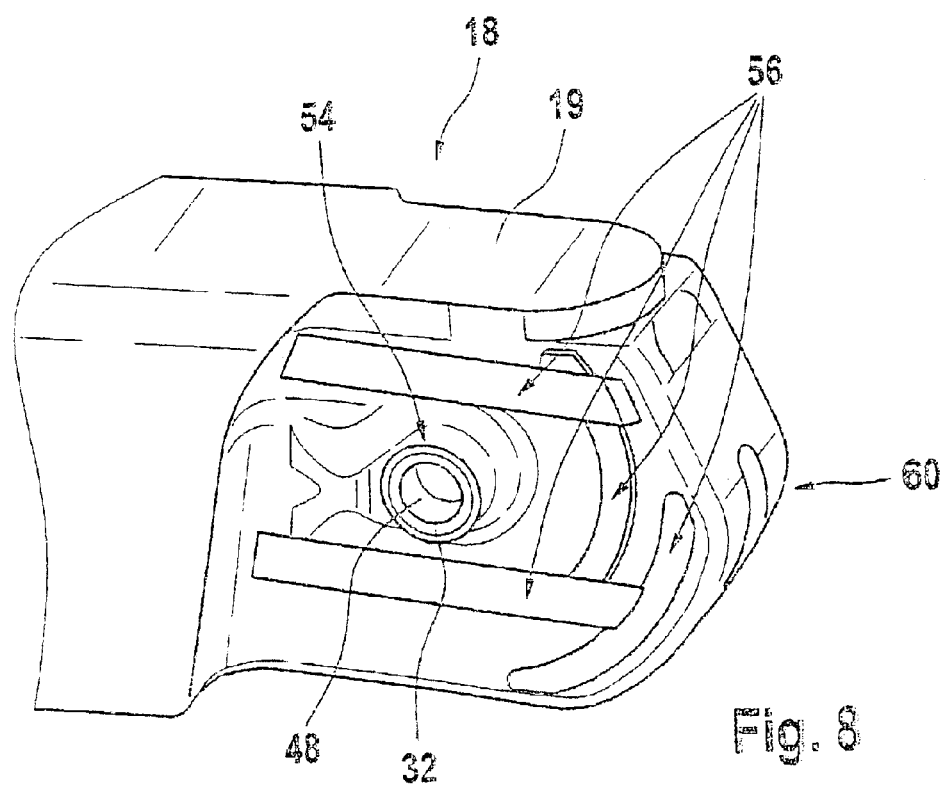
FIG. 8, a perspective view in detail of a second end of a pivot part of the invention.

In FIG. 8, the second end 18 is shown again in detail. The hinge pin 32 has the fastening element 48 as well as a detent element 54, which is embodied as a notch. This notch allows the guard cap to snap into place in the intended operating position, and prevents the guard cap 50 from being folded shut unintentionally. To improve the sliding properties between the pivot part 12 and the fastening part 14, guideways 56 in the form of raised areas are disposed concentrically to the hinge pin 32 on the side cheeks 21 of the second end 18 of the pivot part 12; these guideways make a slight rotation of the pivot part 12 relative to the fastening part 14 possible even after relatively long phases of immobility, since the bearing surface area is reduced by the guideways.

Figure 9:
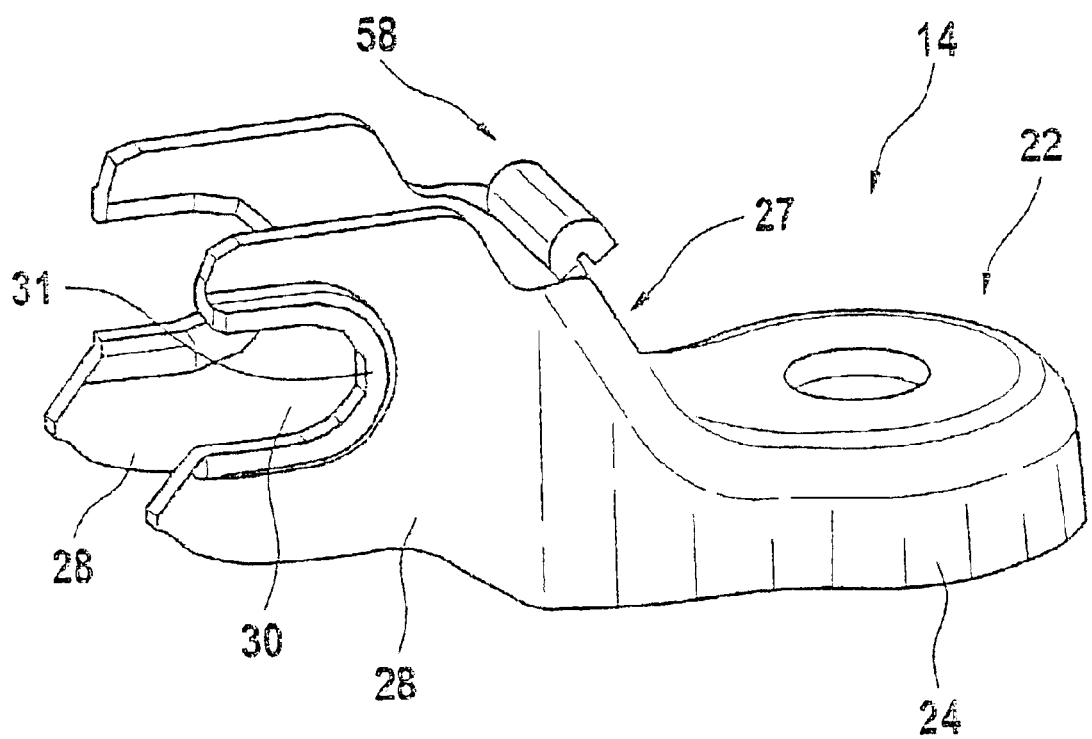
FIG. 9, a variation of a fastening part of a wiper arm of the invention.

In FIG. 9, a fastening part 14 is shown in a variation. In this variation, the reinforcing element 27 is provided with a 180° bend 58 on the edge toward the pivot part. This makes easier assembly of the fastening part 14 onto the pivot part 12 possible. In the assembly process, the hinge pins 32 are introduced into the openings 30; the spring element 42 is caught between the pivot part 12 and the fastening part 14; and finally the fastening part 14 is moved into a stretched-out position toward the pivot part 12. In the process, the fastening part 14 slides with its bend 48 over a back face 60 (FIG. 8) of the pivot part 12.

What is claimed is:

1. A wiper arm (10) comprising an elongated pivot part (12) made of plastic, which has two ends and on a first end (16) can be connected to a wiper blade and also, on a second end (18) remote from the first end, is connected rotatably to a fastening part (14), wherein the fastening part (14) is made of sheet metal, wherein the pivot part (12), at least in a region of the second end (18), is shaped essentially in the form of an inverted U, and the fastening part (14) at least partly embraces the pivot part (12) in said region, wherein the pivot part (12) is tapered in a region of the second end (18), wherein at least one hinge pin (32) extends laterally outward from the tapered region, wherein the fastening part (14) at least partly embraces the pivot part (12) and has at least one U-shaped opening (30) that embraces the at least one hinge pin (32).

2. The wiper arm (10) of claim 1, wherein the pivot part (12) and the fastening part (14) are clamped together via at least one essentially straight spring element.

3. The wiper arm (10) of claim 1, wherein the tapered region, and in particular the hinge pin (32), has least one fastening element (48) for securing a guard cap (50).

4. The wiper arm (10) of claim 1, wherein the hinge pin (32) is braced in the direction of the first end (16) by at least one bracing element (44).

5. The wiper arm (10) of claim 4, wherein the at least one bracing element (44) acts as a stop for limiting a rotational angle.

6. The wiper arm (10) of claim 1, wherein the at least one hinge pin (32) does not extend through the pivot part (12).

* * * * *